UNITED STATES PATENT OFFICE.

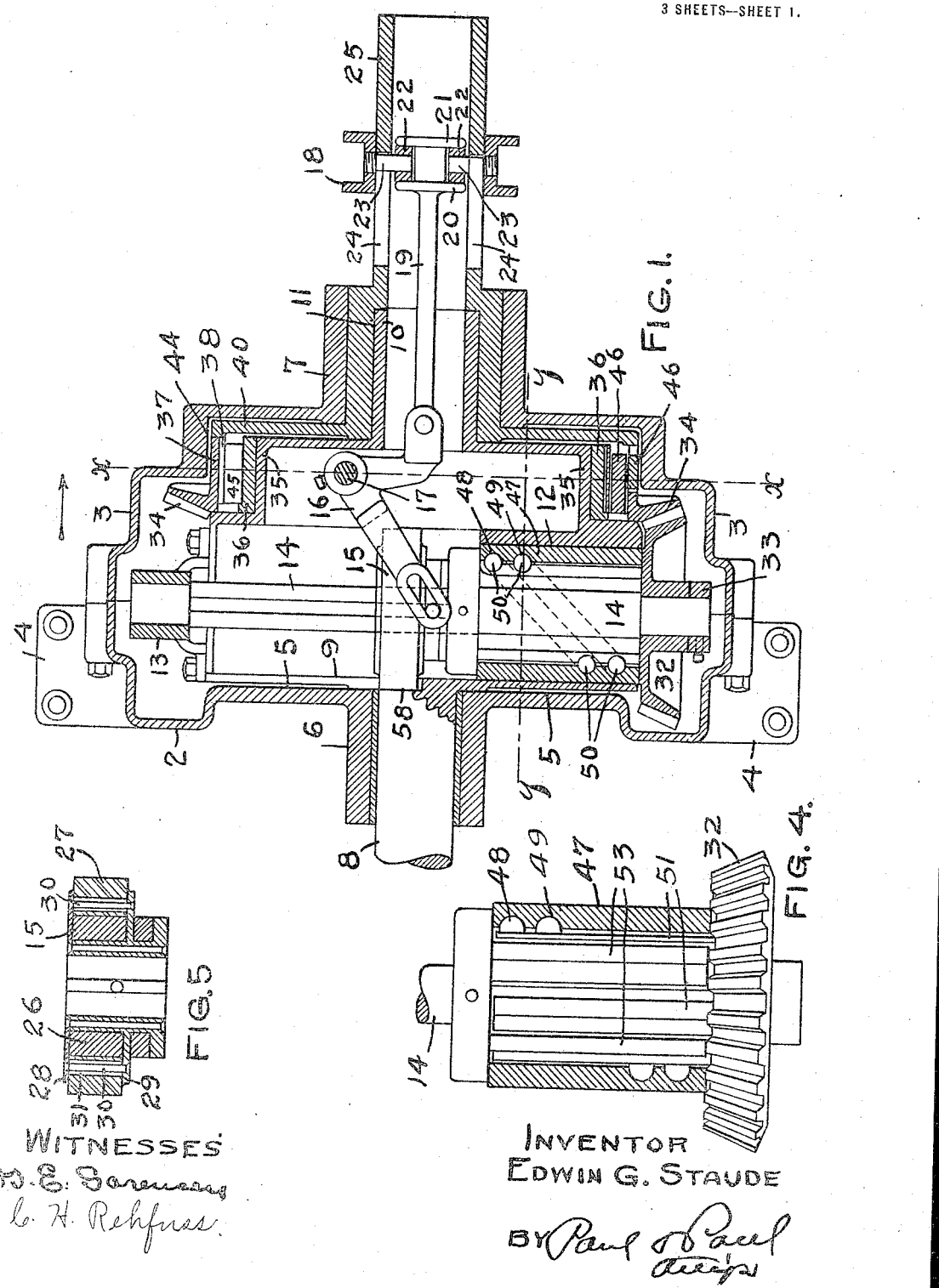

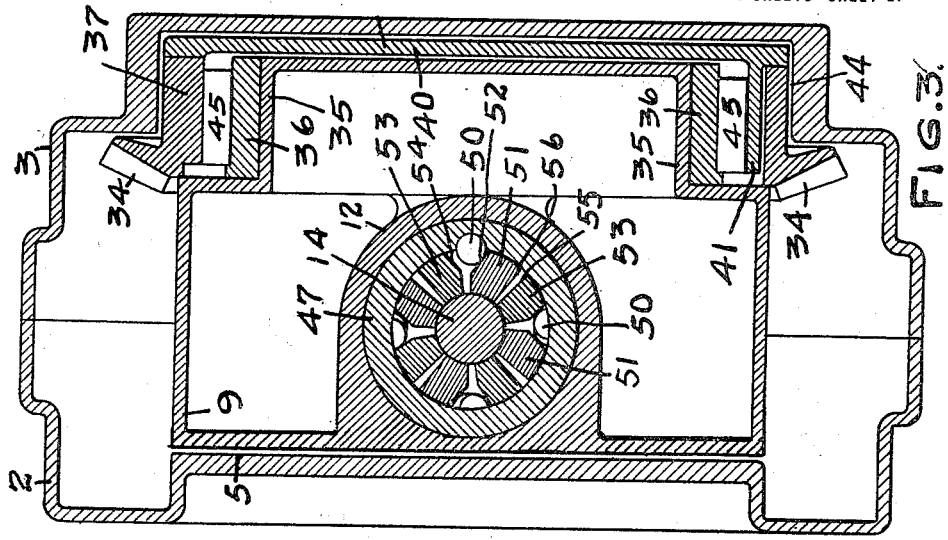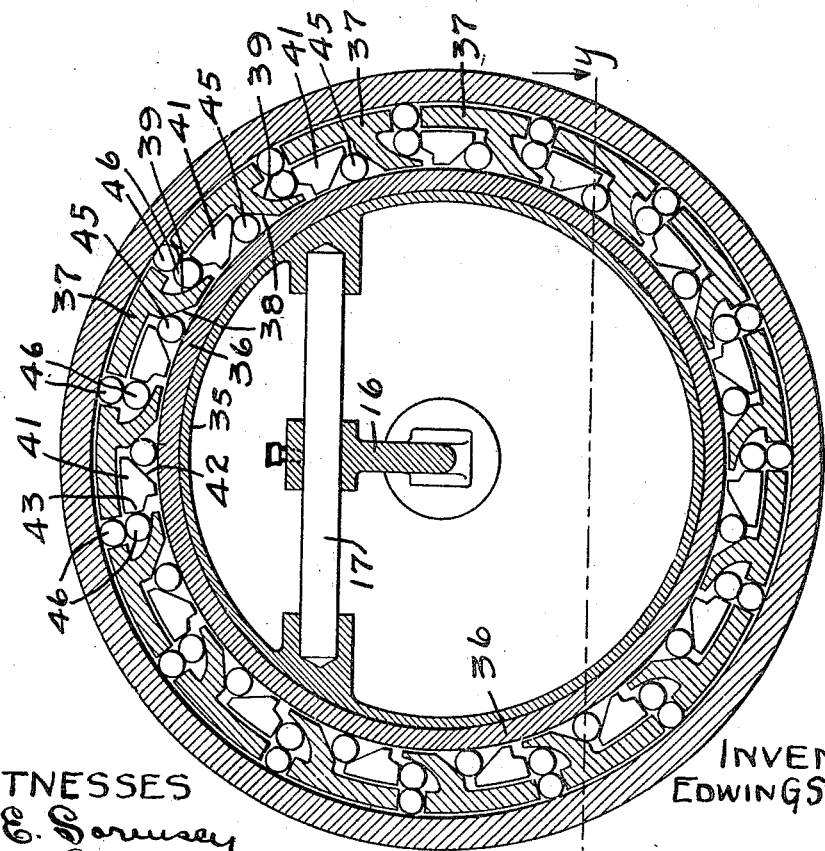

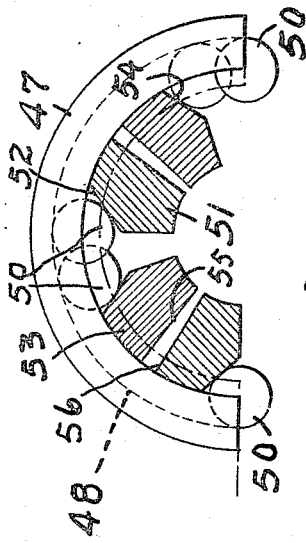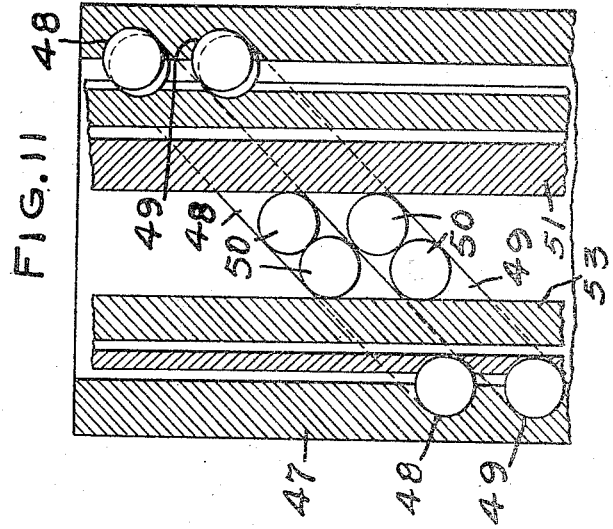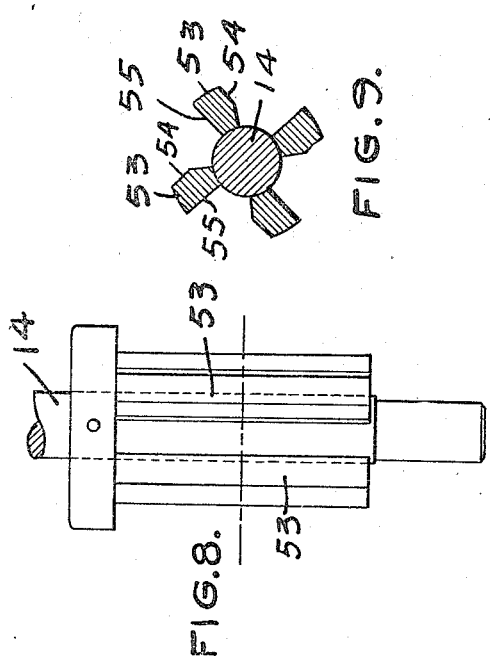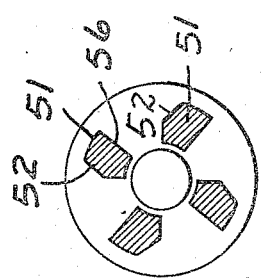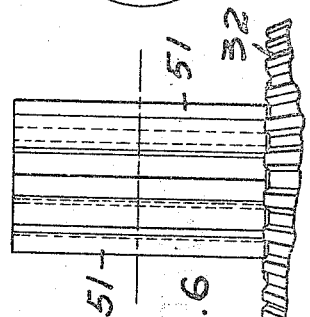

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

VARIABLE-SPEED TRANSMISSION.

1,192,579.        Specification of Letters Patent.     Patented July 25, 1916.

Application filed January 9, 1911. Serial No. 601,644.

*To all whom it may concern:*

Be it known that I, EDWIN G. STAUDE, of Minneapolis, Hennepin county, Minnesota, have invented certain new and useful Improvements in Variable-Speed Transmission, of which the following is a specification.

The primary object of my invention is to provide a positive variable speed transmission which shall be a direct drive on high speed.

A further object is to provide a speed controlling mechanism which will not only act as a power transmitter, but positively govern the speed of the rotating driven member.

A further object is to provide a mechanism which in event power is applied to the driven member it will transmit only a very small portion to the driving member. As for instance a power propelled vehicle going down hill, this construction will prevent spinning the engine.

A further object is to provide a construction which shall be simple and compact as well as highly efficient in the economical transmission of power.

The invention consists generally in various constructions and combinations, all as hereinafter described and particularly pointed out in the claims.

In the accompanying drawings forming part of this specification, Figure 1 is a horizontal section of the variable speed transmission embodying my invention, Fig. 2 is a vertical section on line *x—x* of Fig. 1 looking in the direction of the arrow, Fig. 3 is a section on the line *y—y* of Fig. 1 and Fig. 2, Fig. 4 is a detail of the retarding mechanism, Fig. 5 is a detail of the friction controlling wheel, Figs. 6, 7, 8, 9, 10 and 11 are all details of the retarding mechanism.

As shown in the drawing, (Fig. 1), I provide a stationary housing made in two parts, which I indicate by the reference figures 2 and 3. The part 2 has suitable brackets 4 for supporting the mechanism. On the inside of the part 2 I provide a flat surface 5 and in the center of the flat surface a hub 6 is provided, having a suitable bushing. Opposite the hub 6 on the part 3 I provide a hub 7. The hub 6 furnishes a bearing for the driving member that is preferably cast integral with a frame 9 which supports the various mechanical appliances of the transmission. This frame 9 has a hub 10 which operates in a bearing 11. Mounted in suitable bearings 13 and the annular sleeve 12 is a shaft 14 and splined on the shaft 14 is a friction controlling wheel 15 that is adapted to slide from the central position of the mechanism to a point near the bearing 13, being operated by a bell crank 16 pivoted at a point 17 and connected with the usual operating sleeve 18 by a rod 19. This rod has flanges 20 and 21 between which operate rollers 22 mounted on studs 23, operating through slots 24 of the driven member 25 and connecting with the sleeve 18. I may provide an adjustment for the shaft 14, but I have not shown it in this construction.

To insure the friction controlling wheel being in contact with the surface 5 I have shown in Fig. 5 the detail construction of this wheel, consisting, preferably, of a suitable resilient material 26 over which I form an annular ring 27 made preferably of tarred fiber, which I have found suitable for this purpose. The ring 27 of tarred fiber is held between the flanges 28 and 29 by rivets 30 which pass through holes 31 in the ring 29. These holes are considerably larger than the rivets 30 and permit a yielding movement of the part 27 against the cushion 26 when pressure is brought against the surface of the part 27 and with this construction I am able to set the shaft 14 and with it the controlling wheel 15 fairly tight against the surface 5 and still permit its running freely and adjusting itself automatically to wear. On the end of the shaft 14 opposite to the bearing 13 I provide a bevel gear 32 loosely mounted and held in place by a collar 33, (Fig. 1) secured to the shaft 14. This bevel gear 32 is in mesh with another bevel gear 34 which has a bearing on the annular flange 35, cast integral preferably with the part 9.

In the drawing I have shown a sleeve 36 shrunk on the flange 35. I prefer to make this sleeve of tool steel properly hardened so as to permit of the roller bearing arrangement shown in Fig. 2.

Opposite the face of the gear 34 I provide projections 37 having inclined surfaces 38 and 39. The driven member 25 has formed on its inner end a flange 40 and secured to this flange 40 are projections 41 having inclined surfaces 42 and a surface 43. The part 36 being rigid with the casting 9 which is part of the driving member 8, it follows that the part 36 makes the same number of revolutions as the part 8 and operates at substantially uniform speed. The part 3 has an annular recess 44 and is stationary. The projections 37 are a part of the gear 34 and the projections 41 a part of the driven member 24.

The gear 34 and with it the projections 37 travel counter-clockwise in Fig. 2 and the surfaces 38, contacting with the rollers 45, will push them against the projections 41 and operate the driven member. In case, however, the driven member 25 and the projections 41 should begin to run faster than the gear 34 as, for instance, in power-propelled vehicles running down an incline, the projections 41 will move out of contact with the rollers 45 and the surfaces 43 contacting with the rollers 46 will, with the coöperation of the surfaces 39, force these rollers 46 outwardly and clamp them against the stationary part 44, thereby checking the speed of the driven member or retarding it to correspond with the movement of the gear 34 and the projections 37.

With the construction so far described, the gear 34 is operated through the movement of the gear 32, and should I make no further provision, I would have to depend upon the friction between the controlling wheel 15 and the surface 5 to carry the bulk of the load. To obviate this objection, I insert a hardened steel sleeve 47 securely within the annular sleeve 12. This sleeve 47 has recesses 48 and 49, substantially semi-circular in form, and lying in planes inclined to the axis of the sleeve. In practice I find that the preferred angle of inclination to obtain the best results, is between 45 and 70 degrees. Within these recesses I place balls 50, preferably two in number, and divide the circle up into four parts. Lugs 51 integral with the gear 32 have inclined surfaces 52. On the shaft 14 I secure lugs 53 having inclined surfaces 54. I place these lugs together, as shown in Fig. 4, and insert two balls between the surfaces 52 and 54. These balls operate in the corresponding recesses 48 and 49. I do not confine this construction to two recesses, as I may use any number that is required to retard the controlling mechanism. From the construction just described it is evident that the tendency of the gear 32 is to revolve and if the load at the point 24 is heavy enough, it will cause the friction controlling wheel 15 to slip on the surface 5; but, by putting the balls in the position just described, the lugs 51 will force the balls 50 along in the recesses 48 and 49. The inclined surface 54 on the lug 53 will retard the movement of these balls except in so far as they revolve with the controlling wheel 15 and cause a friction on the surface of the recesses 48, 49, 52 and 54 so that it will take but a small amount of power from the controlling wheel to retard the movement of the gear 32 and at the same time the friction will be insufficient to prevent the controlling wheel 15 from advancing the lugs 53, and the moment they advance, the balls 50 will be free to follow the recesses 48 and 49 until they have again come in contact with the inclined surface 54. By moving the controlling wheel 15 into the position shown in Fig. 1 and over the flat portion 58 on the driving member 8, it is evident that the controlling wheel 15 cannot revolve, neither is there any movement under the surface 27, which would be the case if I should apply this to a revolving disk and move the controlling wheel to the center of the disk. This movement would in time cause a flat spot to wear on the surface 27 and consequently destroy the utility of the mechanism. With the position of the controlling wheel 15 over the surface 58 the mechanism is then a direct drive. That is to say, there are no parts moving within the gear mechanism.

I do not confine this invention to the precise construction shown herein, as it is evident that the same may be altered in many ways by anyone familiar in the art, without departing from my invention.

The operation of this transmission is as follows:—Power being applied to the member 8, the controlling wheel being in the position shown in Fig. 1, will revolve the driven member 25 at the same speed. By moving the member 18 toward the transmission the bell crank 16 will carry the controlling wheel 15 away from the surface 8 and on to the stationary surface 5. This will revolve the controlling wheel 15 slowly and permit the bevel gear 32 to roll by the surface of the gear 34 and allow the driven member to travel at a slower speed. By a continuation of the movement of the controlling wheel 15 to the outer edge of the surface 5 the bevel gear 32 will at this point travel fast enough so that it will make the necessary number of revolutions to permit the gear 34 to remain entirely stationary. Should the load on the gear 34 not be sufficient to revolve the gear 32, it is evident that the controlling wheel 15 will pick up the gear 32 and the surface 55 driven by the shaft 14 will come in contact with the surface 56 on the gear 32. The space between this is only sufficient to permit the free working of the balls 50 when the surfaces 55 and 56 meet.

As shown, the annular sleeve 12 is formed integral with the part 9 as above described, but I may make this feature as well as the bearing adjustable to take up the wear on the controlling wheel 15. Since this wear is very slight, it will not materially affect the mesh of the gear 32 with the gear 34.

I claim as my invention:—

1. A power transmission mechanism comprising a driving member, a driven member, an automatic braking device interposed between said members and arranged to become operative during a period when the driven member temporarily becomes the driving member.

2. A power transmission comprising a driving member, a driven member, operative connections interposed between said members, said connections including a gear 34, having surfaces 38, rollers 45, a flange 36, and driven members 41 between which and said surfaces 38 said rollers are inserted.

3. A power transmission device comprising a driving member, a gear operatively connected with said driving member and having projections thereon, a driven member also having projections adjacent to said gear projections, rollers loosely interposed between the projections of said gear and said driven member to be forced against the projections of the latter, a seat for said rollers, and means for checking the speed of said driven member and projections when it exceeds the speed of said gear.

4. A power transmission device comprising a driving member, a gear connected therewith and having projections thereon, a driven member having projections, rollers interposed between the projections of said gear and said driven member, a seat for said rollers, a stationary member encircling said projections and said rollers, and braking means arranged to be forced into contact with said stationary member when said driven member and its projections exceed the speed of said gear.

5. A power transmission comprising a driving member, a driven member, gears 32 and 34 meshing with one another and interposed between said members, a sleeve mounted on said gear 32, and means in connection with said sleeve for retarding and controlling said gear 34.

6. A power transmission including a driving member, a driven member, a controlling mechanism interposed between said members and including a friction controlling wheel and disk therefor, means operatively connecting said controlling wheel and said driven member, and an auxiliary braking device between said driven member and said driving member and becoming automatically operative when the load on said driven member exceeds the frictional control of said wheel.

7. In a power transmission device, a controlling mechanism including a gear 32, a shaft 14 whereon said gear is mounted, a sleeve carried by said gear, lugs inclosed by said sleeve, said sleeve having semi-circular recesses formed therein and disposed in planes inclined to the axis of said sleeve, balls disposed in said recesses and lugs mounted on said shaft and having surfaces engaging said balls.

8. A power transmission device comprising a driving member, a driven member, operative connections interposed between said members, said operative connections including a friction controlling wheel having a resilient surface and a friction surface with which said wheel engages, and connected with said driving member, and means for temporarily braking said driven member in case its speed exceeds that of said driving member.

9. A power transmission device comprising a driving member, a driven member, operative connections interposed between said members, means for checking the speed of said driven member when it exceeds that of said driving member, and a braking device arranged to become automatically operative, through an increase in the load upon said driven member.

10. A power transmission device comprising a driving member, a sleeve driven therefrom, a series of rollers having bearings on said sleeve and adapted to slide thereon, means in the rear of said rollers and driven from said driving member, a driven member having projections in front of said rollers and operated thereby through the movement of said rollers over said sleeve, a stationary member, and braking means forced into contact with said stationary member by said driven member when its speed exceeds that of said driving member.

11. A power transmission comprising a driving member having projections thereon provided with surfaces 38 and 39, a driven member having projections thereon provided with surfaces 42 and 43, rollers interposed between said surfaces 38 and 42 through which said driven member is operated, a stationary member, rollers 46 interposed between said surfaces 39 and said stationary member and arranged to be forced against said stationary member when the increase in speed of said driven member and projections 41 forces said rollers 46 against said surfaces 39.

In witness whereof, I have hereunto set my hand this 5" day of January 1911.

EDWIN GUSTAVE STAUDE.

Witnesses:
 GENEVIEVE E. SORENSEN,
 C. H. REHFUSS.